Oct. 9, 1962    H. B. FROST    3,057,733
METHOD OF COLORING AND TREATING NUTS
Filed June 7, 1960
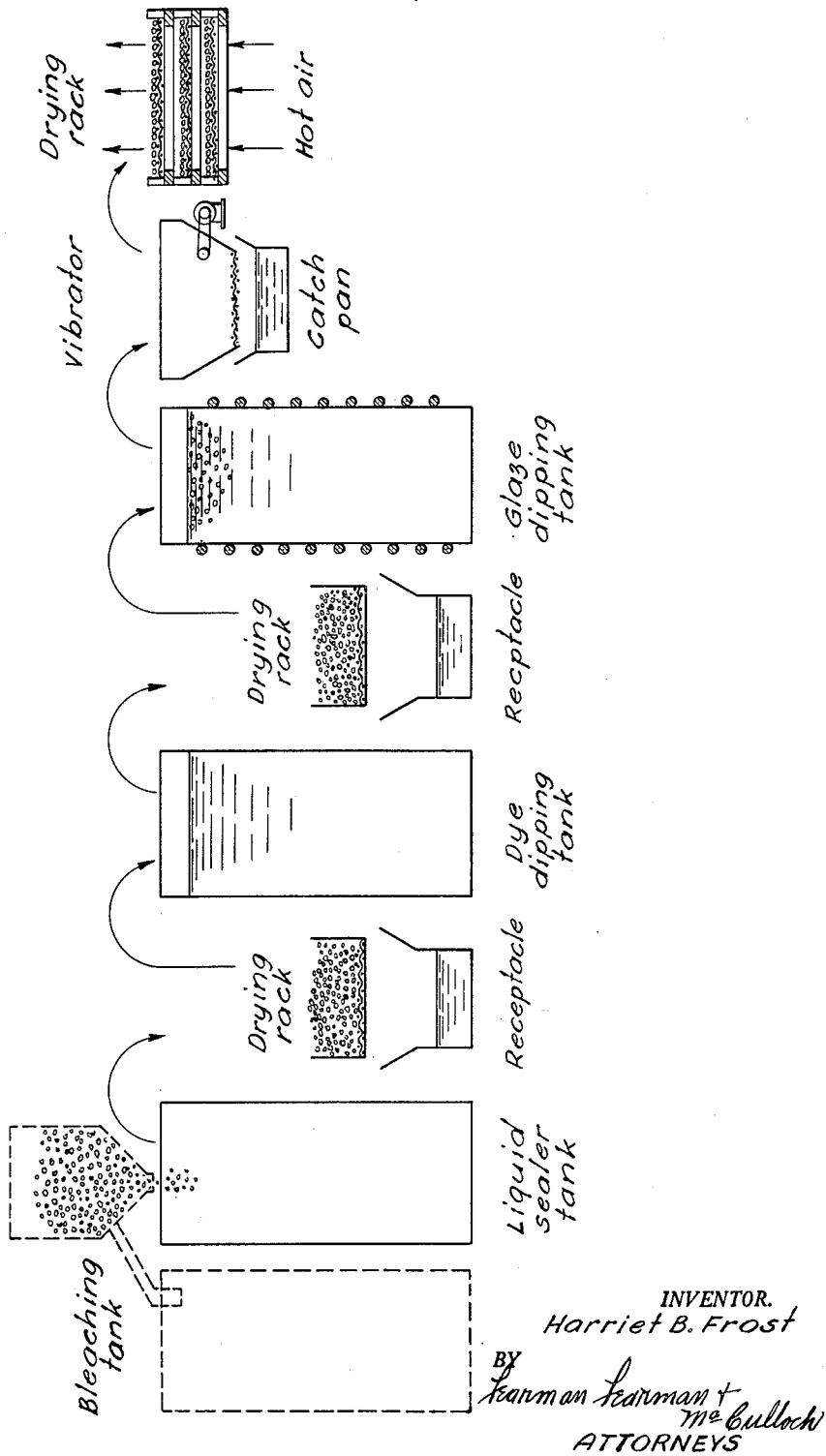
INVENTOR.
Harriet B. Frost
BY
Pearman Pearman &
McCulloch
ATTORNEYS

3,057,733
METHOD OF COLORING AND TREATING NUTS
Harriet B. Frost, 3288 U.S. 23, Bay City, Mich.
Filed June 7, 1960, Ser. No. 34,570
6 Claims. (Cl. 99—126)

This invention relates to a new and novel method of treating edible nuts, and more particularly to a method of treating walnuts, in the shell, to change the exterior surface of the shell from a natural dull appearance, to a bright, shiny appearance, and in various bright colors, thus providing a more desirable product with considerably enhanced eye appeal, materially increasing the salability thereof, and making the nuts especially adaptable and appropriate for the Christmas season.

One of the prime objects of the invention is to provide a very simple, practical and inexpensive method of treating walnuts in the shell; by first applying a sealer for sealing the pores and openings, then dyeing them to desired color, and then treating and coating the dye colored nuts so that the dye will be sealed in and not come off in handling.

Another object is to provide a method of treatment by means of which nuts in the shell can be treated and colored red, green, blue, yellow, gold, or any other desired color, making them especially adaptable for use in nut bowls, hung as ornaments on Christmas trees, stuffed in children's stockings, and used as room ornamentations and decorations generally.

A further object is to provide a method of treatment which is simple, easy and inexpensive to perform, and in which all of the excess dye and glaze material can be recovered and reused, thus producing substantial savings and insuring that each nut will be uniformly colored and coated, and further providing a uniform, attractive product at a minimum cost.

A suitable apparatus for practicing the invention described is illustrated diagrammatically in the accompanying drawing, the arrows indicating the path of travel of the nuts through the apparatus; but it is to be expressly understood that such drawing and the particular procedure described in connection therewith are for purposes of illustration only and are not to be taken as defining the limits of the invention.

According to the instant invention, the nuts are first sorted to remove all badly cracked and broken nuts which would permit liquid to seep into the shell, after which a suitable sealing agent is applied, either by dipping or spraying, to seal the pores in the nut as well as all small cracks and openings, and after the sealer has dried, the next step is to provide a dye of desired color, and here again the dye can be applied by spraying, or the dye can be placed in a dip tank 6, and the nuts (not shown) can be placed in this tank, and while in the instant invention, I shall show and describe the process as utilizing tanks for the various liquids, it will be understood that this is for explanatory purposes only, and the nuts can be placed on conveyors and the liquids sprayed on the product, or otherwise applied as desired.

After the spraying or complete immersion of the nuts in the dye, they are removed from the tank 6 and placed on drying racks 7 to reclaim the excess dye which drips from the nuts into a suitable receptacle 8, the nuts being piled deep in these drying racks 7 to facilitate the drying operation. The drying racks are made up preferably of wood, with a perforated screen bottom 9, and to avoid building up pressure within the shell and prevent bursting, the nuts must be air dried (natural) at room temperature.

After thorough drying for a period of approximately some six to eight hours, the dyed nuts are transferred to a glaze tank 10, which contains a conventional confectioner's certified glaze solution, and the dyed nuts are them dumped into this tank so that they may be completely coated with the glaze solution. This glaze coating seals in the dye so that it will not come off on the hands, and also accentuates the intensity of the color of the dye coating, giving it a hard, shiny, artificial glitter especially desirable for Christmas ornaments.

The glaze tank 10 is usually preheated by use of steam pipes 11 or the like to maintain the glaze solution at proper consistency, and inasmuch as this glaze is of a fairly heavy consistency, and the shell is of a rough uneven texture, a relatively thick coating will adhere to the shell. Consequently, when the nuts are removed from the glaze tank, the coating will be of uneven thickness, due to the uneven surface and texture of the shell.

After removal of the nuts from the glazing tank, they are fed into a vibrated trough 14 which is formed with a perforated bottom 15, and when the vibrator V is in operation, the continuous vibration of the trough shakes off the excess glaze material, so that the nut coating becomes of uniform thickness and the nuts retain their natural contour, the excess being collected in a receptacle 16 for reuse.

This vibrating step assures a uniform coating on the nuts, and the recovery of the excess glaze constitutes a substantial saving, and it further provides that the subsequent drying step will be more uniform and satisfactory.

In treating walnuts it is sometimes necessary to first bleach the nuts before sealing, as some nuts may have a darker shell or the shell may be stained, while other batches may be light enough to take the dye colors very well without bleaching. Where bleaching is desired, they can be bleached in a tank 17, this bleaching lightening the color of the shell and the lighter shells taking the lighter shades of dyes better and taking them more evenly.

As the nuts are discharged from the vibrated trough 14, they are placed on drying racks 18 and removed to another area for drying, where they are dried in the presence of circulating heated air at a temperature of between 70 and 90 degrees. The humidity is also controlled to prevent the soft glaze coating congealing in a milky, flaky condition, instead of drying to a clear, hard finish.

To avoid the glaze on one nut adhering to the glaze on other adjacent nuts during the drying operation, and producing rough off-color spots on the shell, the nuts should preferably be but one layer deep, permitting a more complete exposure of the nut surface to the heated air and quicker drying thereof.

For the final drying step I have found it advantageous to use a polyethylene covering (not shown) for a grouping or stacks of racks 18, with the lower end open and heater fan units (not shown) provided beneath each stack to force dry fast and evenly, after which the product can be packaged ready for shipment.

Although the invention has been illustrated and described in connection with the treating of walnuts, it will be understood that it is not limited thereto, but is applicable to all nuts whose customary shell appearance it is desired to change.

What I claim is:

1. The method of treating hard shelled edible nuts in the shell to improve their appearance which comprises, applying a sealer to the surface of said nuts to seal the pores and openings therein, drying the sealed nuts, subjecting the nuts to a liquid dye solution, then drying the dyed nuts and subjecting said dry dyed nuts to a liquid glaze solution, then vibrating the glazed nuts to remove excess glaze solution from same, and then drying said nuts.

2. The method of coloring walnuts in the shell to improve their appearance which comprises, first applying a liquid sealer to the shell of said nuts to seal pores and openings therein and drying the sealed nuts, subjecting said nuts to a liquid dye solution of predetermined color, drying the dyed nuts with air at normal room temperature and subjecting them to a glaze solution to completely coat the shell of the nuts; then passing said nuts over a vibrating means to remove and reclaim the excess glaze, and then force drying said nuts in circulating heated air.

3. The method of coloring nuts in the shell which comprises, first applying a sealer to the surface of said nuts to seal the pores therein, drying the sealed nuts, then impregnating the shells with a liquid dye solution of suitable color, air drying said nuts at a temperature of approximately 60 to 70 degrees under natural conditions, coating the dyed nuts with a liquid glaze solution, vibrating said glaze coated nuts to uniformly distribute the glaze on the shell and reclaim all excess glaze, and then force drying the glazed product in circulating heated air.

4. The method of coloring and enhancing the appearance of walnuts in the shell which comprises, first applying a sealer to the surface of said nuts to seal pores and openings therein, then drying the sealed nuts, applying to the sealed and dried nuts a liquid dye and drying said dyed nuts with air at a temperature of approximately 60 to 70 degrees, then thereafter coating the nuts with a liquid glaze solution to completely cover the exposed surface of said nuts, vibrating said glazed nuts to remove all excess glaze material and leave a coating of uniform thickness which conforms to the natural contour of the nuts, and then force drying said nuts at a temperature of approximately 70 to 90 degrees to provide a clear, hard and brilliant finish.

5. The method of treating walnuts in the shell to enhance their appearance which comprises, first applying a sealer to the surface of said nuts, then drying said sealed nuts, applying to said dried nuts a liquid dye and drying the dried nuts at normal room temperature, then coating said dyed nuts with a composition consisting essentially of a relatively viscous liquid glaze solution, thereafter vibrating the thus glazed nuts to remove excess glaze and conform the glaze remaining on the nuts to the natural contour thereof, collecting excess glaze separated from said nuts through said vibrating operation, and then drying the glazed nuts in circulating heated air.

6. The method of treating walnuts in the shell to improve their appearance which comprises, first subjecting the nuts to a bleaching agent and drying said bleached nuts, then applying a sealer agent to the bleached nuts to seal pores and openings therein, drying the sealed nuts, applying to the sealed nuts a liquid dye solution and drying the dyed nuts at room temperature, thereafter coating the dyed nuts with a liquid glaze solution, vibrating the glazed nuts to remove the excess glaze and conform the glaze remaining on the nuts to the natural contour thereof, and then drying said glazed nuts in circulating heated air to a temperature of approximately 70 to 90 degrees.

References Cited in the file of this patent

UNITED STATES PATENTS

| | | |
|---|---|---|
| 2,108,915 | Bullard et al. | Feb. 22, 1938 |
| 2,218,713 | Kelly et al. | Oct. 22, 1940 |